Feb. 10, 1953     E. A. STALKER     2,627,719
GAS TURBINE COMBUSTION CHAMBER HAVING CONTROLLED LAMINAR
FLOW OF AIR FOR COMBUSTION AND INSULATION
Filed June 13, 1947     2 SHEETS—SHEET 1
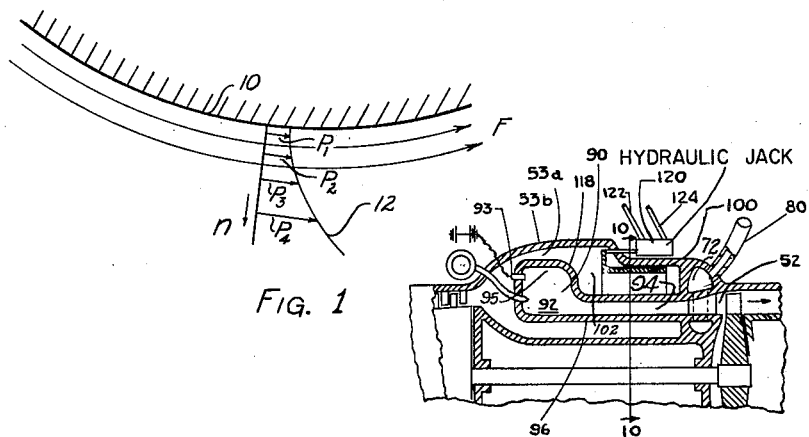
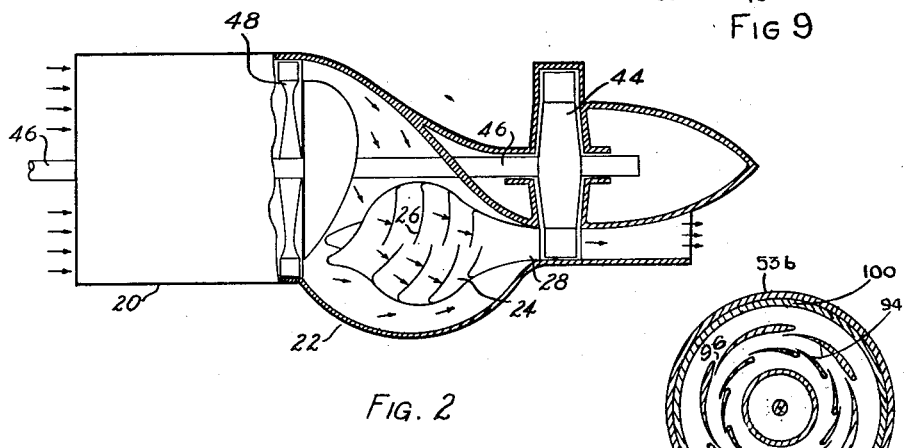
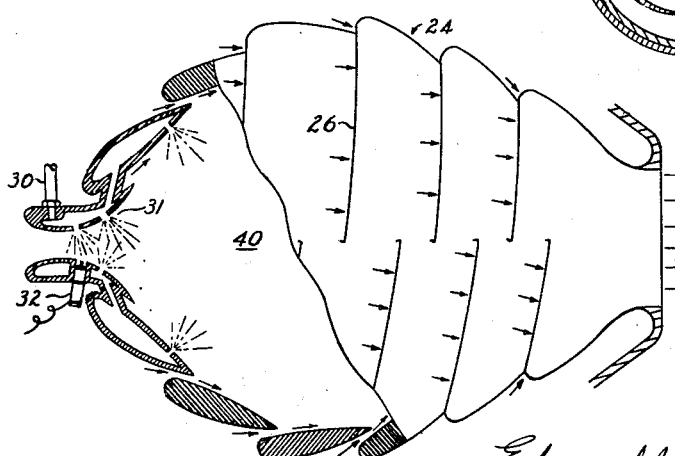
INVENTOR.
Edward A. Stalker

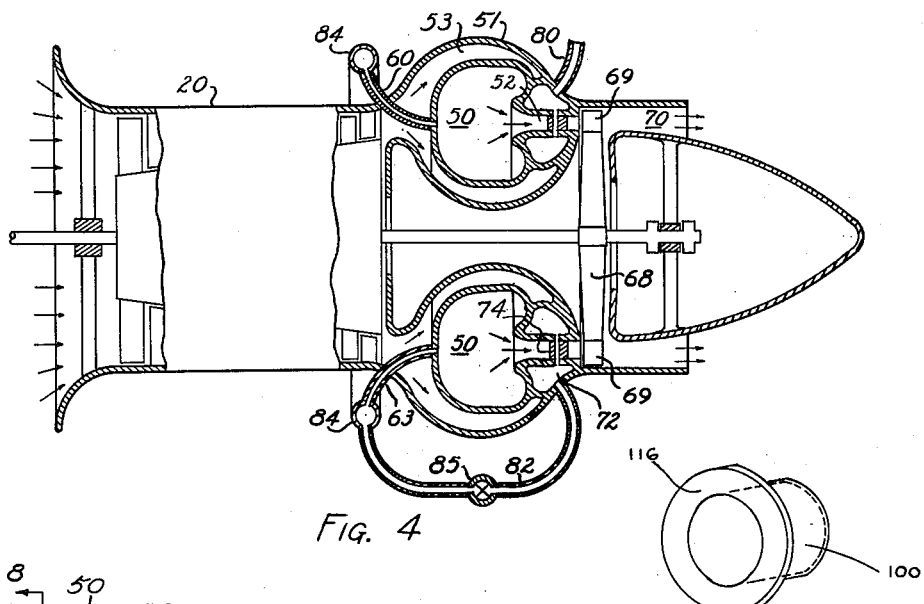
Fig. 4
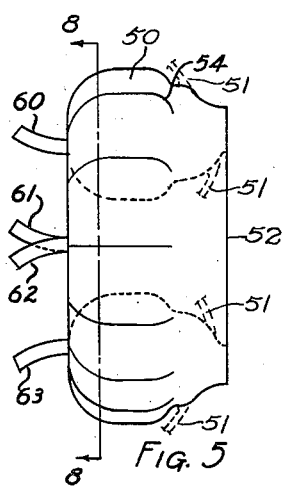
Fig. 5
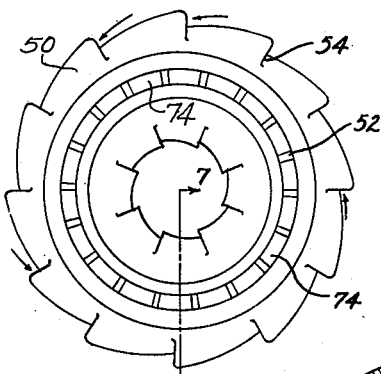
Fig. 6
Fig. 11
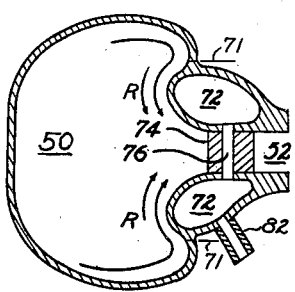
Fig. 7
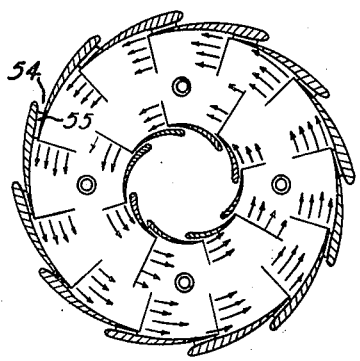
Fig. 8
INVENTOR.
Edward A. Stalker Patented Feb. 10, 1953

2,627,719

UNITED STATES PATENT OFFICE 2,627,719

GAS TURBINE COMBUSTION CHAMBER HAVING CONTROLLED LAMINAR FLOW OF AIR FOR COMBUSTION AND INSULATION

Edward A. Stalker, Bay City, Mich.

Application June 13, 1947, Serial No. 754,499

9 Claims. (Cl. 60—39.36)

My invention relates to improvements in combustion chambers particularly for internal combustion turbines commonly called gas turbines.

This application is a continuation in part of my application Serial No. 538,634 filed June 3, 1944, now abandoned, in which division was required.

The invention has for a general object the provision of a combustion chamber capable of withstanding a high temperature.

Another object is to provide a means of cooling the walls of a combustion chamber.

Still another object is to provide a combustion chamber which is very short in the axial direction but still provides a long flow path for the completion of combustion.

Other objects will appear from the description, drawings and claims.

The objects of the invention are accomplished by the means illustrated in the drawings in which—

Figure 1 shows the flow of fluid along a convex surface;

Figure 2 is an axial fragmentary section through a turbine;

Figure 3 shows the isolated combustion chamber in section;

Figure 4 is a fragmentary section through another turbine having a short combustion chamber;

Figure 5 is a fragmentary side view of a peripheral induction combustion chamber cut out of the turbine;

Figure 6 is an elevation view of the combustion chamber of Fig. 5 from the nozzle end;

Figure 7 is a section along the line 7—7 in Fig. 6;

Figure 8 is a section along line 8—8 in Fig. 5;

Figure 9 is a fragmentary axial section through a turbine having an elongated combustion chamber and a differential control of the air entering opposite ends thereof;

Figure 10 is a section along line 10—10 in Fig. 9; and

Figure 11 is a perspective view of the sleeve valve isolated from the turbine.

All thermal engines increase in thermal efficiency with increase in initial temperature. In piston type engines very high temperatures of the order of 4500° F. are useable because of the intermittent combustion and cooling. In successful internal combustion turbines, commonly called gas turbines, the combustion is continuous, presenting difficulties in constructing a durable combustion chamber. At present temperatures of only 1500° F. have proved practical in aircraft turbines and only about 1200° F. in industrial turbines where the need for long life is dominant.

Higher temperatures need to be attained in gas turbines to bring their fuel economy in line with piston engines. To do this the combustion chambers must be cooled. The present invention discloses an effective means of keeping the combustion chamber cool without jeopardizing the efficiency or power output of the turbine.

When fluid flows along a surface there is a thin layer of fluid which is retarded by friction with the surface. This layer may be either laminar or turbulent. If it is laminar there is no migration of particles of air from one lamina of the fluid to another whereas in a turbulent boundary layer there is migration.

When the boundary layer is laminar the heat flow through it is by radiation and pure conduction and consequently the quantity of heat reaching the surface from the fluid outside the boundary layer is small. When this layer is turbulent particles of fluid are transported through the layer and carry large quantities of heat with them. Then all means of heat transfer are involved, namely, conduction, convection and radiation. The first means passes very little heat and accounts for the great insulating quality of air when it is kept out of motion or kept laminar. The last means contributes a very small fraction of the heat going to the surface. The second, that is convection, is the large conveyor of heat to the walls.

Laminar flow can be maintained in the boundary layer if the surfaces have thereon a favorable static pressure gradient. That is, if the static pressure is falling in the direction of flow. Thus if the cross sectional area of the chamber is decreasing the velocity will be continuously increasing and the static pressure will be continuously decreasing.

A properly curved surface also facilitates the maintenance of laminar flow in the boundary layer. Consider the curved wall 10 in Fig. 1 where there is a flow F along the convex side. In such a flow there is a thin layer close to the surface which is retarded by friction. This is the boundary layer. On such a curved surface the pressure increases outward in the direction as indicated by the pressure curve 12 whose abscissa are $P_1$, $P_2$, etc. Hence if a particle of air near the surface tends to fly away from the surface due to some disturbance it will meet with increasing pressure tending to return the particle to its original lamina. Hence a convex surface tends to stabilize the boundary layer and make it laminar.

A flow along a concave surface normally tends to be turbulent in the boundary layer.

Centrifugal force may also be employed to preserve the identity of a layer as a whole where it is interposed between hot gases and a concave wall for insulation. The inner layer or boundary layer of such a flow may not be laminar but if the layer is thick enough as a whole it can serve adequately as an insulating layer.

The above principles are employed in the combustion chamber of this invention which will now be described in some detail.

In Fig. 2 the compressor 20 discharges air into the collection chamber 22 from which it flows into the combustion chamber 24 via the slots 26. These are disposed diagonally to the axis of the combustion chamber so that the contents are given a rotation as they flow to the exit end forming nozzle 28.

Fuel is injected into the combustion chamber through fuel tube 30 and orifices 31. It is ignited by spark plug 32. See Fig. 3.

The gases resulting from the combustion within the combustion chamber flow from the region 40 where the velocity is low to the smaller cross section at the nozzle 28 where the velocity is high. The combustion chamber changes its cross section gradually by the convergence of the convex walls which therefore have a favorable gradient in the direction of flow conducive, as described above, to the production and maintenance of a laminar flow in the boundary layer and a streamline flow in the outer layers.

The layers of air adjacent each surface, being in the substantially laminar condition, form an insulating layer between the hot gases and the wall protecting them.

The gases resulting from the combustion will be called the motive gas or fluid and it issues from nozzle 28 and impinges on the blade of rotor 44 which is mounted on shaft 46 fixed to the rotor 48 of the compressor. Power may be taken off the end of the shaft protruding beyond the compressor.

Since the insulating layers are cooler than the hot gas some advantage can be taken of centrifugal force to aid in maintaining the identity of the insulating layers. For this purpose the slots 26 are disposed diagonally and formed to discharge the layers with a peripheral component of velocity. Since the chamber walls are concave in this direction centrifugal force will aid in keeping the cool layer as a whole on the chamber surface.

In another form of the invention shown in Figs. 4 to 8 the combustion chamber 50 is of toroidal shape so that it has an annular cross section and has a discharge nozzle 52 which extends about the whole periphery of the turbine.

The compressor 20 discharges into the collection chamber 53 within which the annular combustion chamber 50 is located. The walls of the collection chamber are 51. Air enters the slots 54 which extend axially and are spaced peripherally about the outer and inner walls of the torus like combustion chamber. By inner wall is meant the portion of the chamber facing the axis of the torus shape.

Fuel is injected into the chamber at several points by the fuel lines 60 to 63. The fuel injection will be described more subsequently.

The gases from the combustion within the combustion chamber issue through the nozzle 52 and impinge on the blades 69 of the rotor 68 whence they flow out the annular exhaust duct 70.

A section through opposite walls of one portion of the chamber, that is through a portion on one side of the axis, discloses a cross section contracting to a discharge nozzle at the downstream end.

The combustion chamber is given its special shape both to provide a cooling means and to provide a very short chamber in the axial or lengthwise direction.

By disposing the slots peripherally the major flow direction within the combustion chamber is peripheral at the forward portion becoming principally axial only at the nozzle or exhaust end. Hence the flow within has a very long path giving the fuel ample time to burn completely before issuing through the nozzle. This improves the economy of the turbine and protects the blades by not subjecting them to the impact of burning fuel particles which would unduly heat them and cause erosion by their impact.

Since the cool air flowing along the inner surface of the outer wall is denser than the heated gases it will preserve itself by centrifugal force so as to provide an insulating layer which may not retain its laminar character at great distance from the slot but which can be made sufficiently thick that the lack of laminar character is compensated by added thickness.

The layers of air which enter along the inner wall of the torus will flow along a convex surface inside the chamber and can retain their laminar character. Hence these layers can be thinner than those entering through the opposite wall.

The walls between slots are streamline and directing vanes 55 span the slots 54 between walls. These vanes serve to insure that the air entering the chamber flows peripherally.

The fuel is injected close to the front wall of the chamber as shown in Figs. 5, 7 and 8 so that the fuel will travel the longest path before reaching the nozzle 52.

The fuel is also injected against the flow from the peripheral slots and from points close to the inner wall of the chamber (the wall nearest the axis) because it will be thrown radially outward by the rotation of the fluid within. This gives it a longer burning path of spiral form so that it will be consumed before reaching the outer insulating layers.

When fluid flows into the entrance of a nozzle the approach of the fluid is chiefly radial as indicated in Fig. 7 and not chiefly axial, that is in the region just ahead of the nozzle inlet. Hence for a nozzle positioned as shown in Fig. 7 a large portion of the inflow into the nozzle would normally come substantially equally from the regions adjacent the sides of the nozzle. With a substantial centrifugal effect from the rotation of the air or gas about the axis of the turbine the gas tends to flow into the nozzle chiefly from the region marked R in Fig. 7. Since the fuel tends to be thrown out to the outer wall this means that the length of the path of the burning fuel is increased since it must retrace some of the distance to the nozzle inlet or region R.

The inlet of the nozzle is indented upstream of the nozzle flow and away from the downstream wall of the torus so as to take gas chiefly from the center of the cross section of the chamber where the gases are the hottest.

The slots 54 extend only to line 71, Fig. 7, that is only to the cooling jacket 72 which is disposed about the nozzle portion containing the vanes 74 for directing the gases properly toward the blades 69 of the turbine rotor. These vanes require cooling and this is done by the flow of liquid fuel through their hollow interiors 76. See particularly Fig. 7.

The fuel flows to the jacket 72 via tube 80 coming from some suitable source. It then flows through the jackets and the vane interiors and issues into tube 82 which conveys the fuel to the header 84 encircling the turbine axis. A suitable valve 85 is placed in the line to control the flow and other valves may be placed at other localities as, for instance, in line 80. From the header the tubes 60—63 feed into the combustion chamber.

In another form of the invention the combustion chamber 90 is comprised of two portions, the main chamber 92 where the fuel and air are kept in the proper ratio for combustion and the auxiliary chamber where air is admixed with the gas or products of combustion from the main chamber to establish the proper gas temperature going to the turbine rotor.

Fuel is injected into the main chamber 92 in the same manner as shown for 50 in Fig. 4. The air enters also in the same manner as for 50 as shown in Figs. 4 to 8. The swirl of the air in the chamber 92 keeps substantially all the burning fuel within this chamber while it is burning. As the gas from chamber 92 passes into chamber 94, air is progressively mixed with the products to bring the gas temperature to the proper value. The gas passes out of 94 via the nozzle 52.

It is to be noted that the main chamber has the greater diameter. Due to the centrifugal action on the air as result of its spin about the turbine axis the cooler gases or air and the fuel tend to be thrown toward the periphery. The bulge of the combustion chamber at 95 then tends to keep the fuel, and the air it is to combine with, within the bulge. As the gas formed by the combustion increases in temperature it is displaced toward the inner wall 96 of the chamber from whose vicinity it can flow directly into 94.

This combination chamber has the advantage that the fuel can be burned at the correct fuel-air ratio for positive combustion and can be kept in chamber 92 during burning because of the swirl, so as to preserve the desired fuel air ratio.

The turbine can, for instance, be designed to operate between the limiting fuel air ratios of 1 to 16 and 1 to 12 at all times. This is accomplished by varying the position of the throttle sleeve valve 100 axially which controls the quantity of air differentially between the chambers 92 and 94. When the valve 100 is slid forward the major portion of the air flow enters the chamber 92 and only a small portion enters 94. As the valve is slid rearward, the ratio of air entering 94 is increased relative to the quantity entering 92. Thus the valve 100 controls the flow differentially between the two chambers 92 and 94. When the fuel injected through tubes 60 and 63 is reduced, the sleeve valve 100 is moved toward the turbine rotor 69 so as to increase the gap 102 and give more air free access to the interior of 94 through slots therein thereby reducing the amount of air entering 92 for a predetermined total quantity of air. Thus the fuel air ratio is kept at a desired value.

When the fuel injection is increased into chamber 92 the sleeve valve is moved away from the turbine rotor to reduce the gap 102 and amount of air entering 94. This action differentially increases the amount of air entering 92, thus again maintaining a desired fuel-air ratio.

The fuel is ignited initially by the plug 93.

The sleeve valve 100 is shown isolated from the turbine in Fig. 11. It is cylindrical in shape with a flange 116 at one end. This flange cooperates with the wall 118 of the chamber 92 to control the flow of air to the slots in the wall of chamber 94. These slots 96 give the air in the toroidal chamber 94 a very large peripheral velocity. The sleeve valve 100 slides within the collection chamber 53a upon the inner surface of its wall 53b. The valve is moved by several hydraulic cylinders 120 served from a suitable source of fluid by the tubes 122 and 124.

To recapitulate this invention comprises combustion chambers wherein combustion is made to occur in an enlarged portion where the velocity is low and the static pressure is high. This portion is gradually and smoothly reduced in cross section by convex walls so that a favorable pressure gradient exists along these walls to the exit end of the chamber. The favorable gradient maintains a layer of laminar flow on the surface of the chamber. Heat passage through such a layer is by radiation and conduction only, that is by molecular activity. The normally large transfer by the convective process is excluded. By this arrangement about 70% of the heat tending to reach the walls can be excluded.

The insulating layer can be made to keep its identity due to centrifugal pressures arising from directing the flow with a peripheral component along concave surfaces. The layer may not preserve its laminar character for as great a distance along its path of flow on the concave wall surface but it is practical on this surface to make the layer thicker so that a convective process cannot carry hot particles of gas to the wall quickly enough to cause undue heating. This is so because the layers grow in thickness at each successive slot due to superimposition of layers.

The combustion chamber in one form is constructed to admit air in major part peripherally at the large end of the combustion chamber where the axial velocity is low. Hence the chief direction of flow is peripheral greatly increasing the length of path throughout which burning takes place. This construction permits a very great shortening of the combustion chamber and hence of the turbine. This is very important particularly in aircraft use.

In another form the local cross section of the main combustion chamber shows this section to be unsymmetrical with respect to the inlet of the passage leading out of the main combustion chamber. Since there is a spin of the fluid in this chamber the denser fluid (air, gas and fuel) is thrown outward beyond the said inlet. Not until this fluid is heated and becomes less dense is it displaced toward the axis where it can flow from the chamber. This facilitates complete combustion of the fuel and the maintenance of the correct fuel ratio.

While I have disclosed a preferred embodiment of my invention it is to be understood that I do not intend to limit myself to the precise forms disclosed but intend to claim my invention broadly as set out in the appended claims.

I claim:

1. In combination in a gas turbine, an axial flow compressor for compressing air, an annular combustion chamber having a main flow passage of annular cross section about an axis, said chamber having a plurality of peripherally spaced admission slots in opposite walls of said passage adapted for directing said compressed air into the interior with a large peripheral component of velocity about said axis along the inner surfaces of said combustion chamber, means causing combustion in said chamber producing a motive gas, said combustion chamber having a nozzle for discharging said motive gas at a high velocity with an axial component, an axial flow turbine rotor for receiving said motive gas jet and being rotated thereby, the axial cross section through opposite walls of said chamber passage tapering from a large end to a small end comprising said nozzle, and a cooling jacket about said nozzle for circulating liquid therethrough, said peripheral slots extending substantially to the upstream end of said jacket.

2. In combination in a gas turbine having a general axial direction, an axial flow compressor for compressing air, an annular combustion chamber having a main flow passage of annular cross section about said axis, said chamber having a plurality of peripherally spaced admission slots in opposite walls, said slots being adapted for directing said compressed air into the interior with a large peripheral component of velocity about said axis along the inner surfaces of said combustion chamber, means causing combustion in said chamber producing a motive gas, said chamber having a nozzle discharging said motive gas at high velocity with an axial component, and an axial flow turbine rotor receiving said motive gas jet and being rotated thereby, the cross section through opposite walls of said chamber passage along said axis being large at one end tapering gradually to a small section at said nozzle, the inlet of said nozzle being substantially inset from the downstream wall of said combustion chamber.

3. In combination, outer and inner walls defining a heating chamber having an annular combustion space therebetween, said chamber having its length in the direction of a main flow therethrough, said inner and outer walls each having a plurality of peripherally spaced slots, each said slot having a substantial projection of length along said length of said chamber and extending through the walls thereof, means to discharge jets of compressed air into said combustion chamber through said slots, said slots having their walls offset one to the other to direct said compressed air jets transversely to said chamber length and substantially tangentially along the inner surfaces of said walls thereby inducing a spin of the air within said chamber, said slots as a group being extensive over a major portion of said chamber length, said compressed air jets forming insulating layers adjacent the walls of said chamber, and means to heat said air within said chamber to provide a motive gas, said chamber having a discharge nozzle at its downstream end for emitting said motive gas as a motive jet, said nozzle directing said jet.

4. In a gas turbine in combination, a heating chamber of torus form defining an annular passage within for the flow of a gas, said chamber having a plurality of peripherally spaced slots in opposite walls of said passage, said slots extending in the direction of the axis of said torus and extending through the walls thereof, and means to discharge jets of compressed air into said combustion chamber through said slots, said slots having their walls offset one relative to the other to direct said compressed air jets substantially along the inner surface of said chamber walls thereby inducing a spin of the air within said chamber, said compressed air jets forming insulating layers adjacent the walls of said chamber due to their mass and the centrifugal force acting thereon, said chamber having a discharge nozzle at its downstream end emitting said motive gas as a jet, said nozzle directing said jet onto the rotor of said turbine.

5. In a gas turbine in combination, a heating chamber of torus form defining an annular passage within for the flow of gas, said chamber having a plurality of peripherally spaced slots in opposite walls of said passage, said slots extending in the direction of the axis of said torus and extending through the walls thereof, and means to discharge jets of compressed air into said combustion chamber through said slots, said slots having their walls offset one relative to the other to direct said compressed air jets substantially along the inner surfaces of said chamber walls thereby inducing a spin of the air within said chamber, said compressed air jets forming insulating layers adjacent the walls of said chamber due to their mass and the centrifugal force acting thereon, said chamber having a discharge nozzle at its downstream end with the nozzle entrance indented upstream from the rear wall of said torus-shaped chamber, said nozzle emitting said motive gas as a jet directed onto the rotor of said turbine.

6. In combination in a gas turbine, a main combustion chamber of toroidal form having an exit positioned substantially inward from the outer wall thereof, said chamber defining an annular passage within for the flow of gas, an auxiliary chamber defining an annular passage of substantially smaller diameter, said auxiliary chamber being in communication with said main chamber exit to receive a flow of gas therefrom, slot means to introduce air into said main chamber along the inner surfaces of the toroidal form with a high rate of spin about the axis of said toroidal form, and means to burn fuel in said air in said main chamber to produce said gas, said spin throwing said fuel and coolest air or gas toward the periphery of said main chamber and away from said exit to displace the hottest gases toward said exit.

7. In combination in a gas turbine, walls defining a combustion chamber having an exit positioned substantially inward from the outer wall thereof, an exit duct of substantially smaller diameter, said chamber being adapted to have a flow therethrough defining a general direction of an axis, said exit duct being in communication with said chamber exit to receive a flow of gas therefrom, said walls of said chamber defining a plurality of peripherally spaced slots extending as a group in the direction of said axis along a major portion of said chamber length to admit slot flows into said chamber, said slots each having a component of length in said axial direction to direct a said slot flow substantially tangentially along the chamber inner surface at a substantial angle to said axis to produce a high rate of spin about said axis, means to introduce air into said chamber through said slots, and means to burn fuel in said air in said chamber to produce said gas, the fuel and coolest air and gas being thrown by said spin toward the periphery of said chamber and away from said exit thereby displacing the hottest gases toward said exit, said combustion chamber tapering in cross sectional area to said exit of relatively small area in comparison to the maximum cross section thereof.

8. In combination in a gas turbine, a main combustion chamber of toroidal form having an annular exit positioned substantially inward nearer the axis of said toroidal form than the outermost wall portion thereof, said chamber defining an annular passage within for the flow of gas, an auxiliary chamber having an annular passage therethrough of substantially smaller diameter, said auxiliary chamber being in communication with said main chamber exit to receive a flow of gas therefrom, slot means to introduce air into said main chamber with a high rate of spin about the axis of said toroidal form along the inner surfaces of the toroidal form, and means to burn fuel in said air in said main chamber to produce said gas, said spin throwing said fuel and coolest air or gas toward the periphery of said main chamber and away from said exit to displace the hottest gases toward said exit, the inner wall of said auxiliary chamber being substantially in line with the inner wall of said main combustion chamber.

9. In combination in a gas turbine, walls defining a combustion chamber having an exit positioned substantially inward from the outer wall thereof, an exit duct of substantially smaller diameter, said chamber being adapted to have a flow therethrough defining a general direction of an axis, said exit duct being in communication with said chamber exit to receive a flow of gas therefrom, said walls of said chamber defining a plurality of peripherally spaced slots extending as a group in the direction of said axis along a major portion of said chamber length to admit slot flows into said chamber, said slots each having a component of length in said axial direction to direct a said slot flow substantially tangentially along the chamber inner surface at a substantial angle to said axis to produce a high rate of spin about said axis, means to introduce air into said chamber through said slots, and means to burn fuel in said air in said chamber to produce said gas, the fuel and coolest air and gas being thrown by said spin toward the periphery of said chamber and away from said exit thereby displacing the hottest gases toward said exit.

EDWARD A. STALKER.

REFERENCES CITED

The following references are of record in the file of this patent:

UNITED STATES PATENTS

| Number | Name | Date |
|---|---|---|
| Re. 23,149 | Lubbock | Sept. 20, 1949 |
| 972,504 | Brown | Oct. 11, 1910 |
| 1,618,808 | Burg | Feb. 22, 1927 |
| 1,733,792 | Good | Oct. 29, 1929 |
| 2,011,420 | Samuelson | Aug. 12, 1935 |
| 2,110,209 | Engels | Mar. 8, 1938 |
| 2,227,666 | Noack | Jan. 7, 1941 |
| 2,268,464 | Seippel | Dec. 30, 1941 |
| 2,445,466 | Arnhym | July 20, 1948 |
| 2,457,157 | King | Dec. 28, 1948 |
| 2,458,497 | Bailey | Jan. 11, 1949 |
| 2,464,791 | Bonvillian et al. | Mar. 22, 1949 |
| 2,477,584 | De Zubay | Aug. 2, 1949 |
| 2,488,911 | Hepburn | Nov. 22, 1949 |
| 2,500,925 | Bonvillian et al. | Mar. 21, 1950 |

FOREIGN PATENTS

| Number | Country | Date |
|---|---|---|
| 25,199 | Great Britain | Nov. 19, 1904 |